United States Patent [19]

Kaneda et al.

[11] Patent Number: 5,087,935
[45] Date of Patent: Feb. 11, 1992

[54] ACTIVE EXTERNAL DISTANCE MEASURING SYSTEM HAVING AN OPTICAL DEVICE IN THE LIGHT PROJECTION AND LIGHT RECEIVING PATHS TO REDUCE PARALLAX

[75] Inventors: Naoya Kaneda; Youichi Iwasaki; Sadahiko Tsuji, all of Kanagawa, Japan

[73] Assignee: Canon Kabushiki Kaisha, Tokyo, Japan

[21] Appl. No.: 469,044

[22] Filed: Jan. 23, 1990

[30] Foreign Application Priority Data

Feb. 1, 1989 [JP] Japan ................................. 1-024418
Apr. 3, 1989 [JP] Japan ................................. 1-085188

[51] Int. Cl.⁵ .............................................. G03B 13/36
[52] U.S. Cl. ................................................. 354/403
[58] Field of Search ............................ 354/403, 404; 250/201.4

[56] References Cited

U.S. PATENT DOCUMENTS 4,549,802 10/1985 Ohtaka ................................. 354/403

Primary Examiner—W. B. Perkey
Attorney, Agent, or Firm—Fitzpatrick, Cella, Harper & Scinto

[57] ABSTRACT

An active, external distance measurement type apparatus for focus adjustment of a photographic lens comprises a light emitting element arranged outside a light beam passing through the photographic lens, a projection lens for projecting light from the light emitting element to an object field, a collection lens arranged in spaced relation to the projection lens by a base line length, and a photosensitive element to which the irregular reflection of the light rays projected by the projection lens onto an object to be phtotgraphed is directed by the collection lens. An optical unit is arranged to refract a portion of each of a projecting light beam and a receiving light beam in a different direction so that parallax is compensated for.

10 Claims, 15 Drawing Sheets

ACTIVE EXTERNAL DISTANCE MEASURING SYSTEM HAVING AN OPTICAL DEVICE IN THE LIGHT PROJECTION AND LIGHT RECEIVING PATHS TO REDUCE PARALLAX

BACKGROUND OF THE INVENTION

1. Field of the Invention

This invention relates to automatic focusing apparatus for photographic lenses and, more particularly, to distance measuring devices of the active type. Still more particularly, it relates to optical systems for use in distance measurement.

2. Description of the Related Art

Apparatuses for automatically focusing a photographic lens have been known in many forms, and various types of distance measuring devices for use in these apparatus have been proposed. One of these systems, for example, is called the passive type because focus detection is performed on the basis of information regarding the contrast of an object to be photographed, or the deviation of the actual position of an object image from the ideal position. Another system which projects a near-infrared light or ultrasonic wave onto an object to be photographed and receives the irregular reflection of the light or wave from the object to form a signal to be used in focus detection, is called an "active" type distance measuring device.

The latter or active type distance measuring device, because of the necessity of projecting the near-infrared light or ultrasonic wave, is comparatively disadvantageous from the standpoint of economy of energy, but has a superiority for detecting focus to an object of weak contrast with which the former or passive type distance measuring device can hardly deal.

The known apparatuses also can be classified in two other types, one of which, when measuring the object distance, uses light entering through all or part of the photographic lens and, therefore, called the TTL (Through-The-Lens) type. The other type which, besides the photographic optical system, has an optical system for focus adjustment is called the "external distance measurement" type. And, the external distance measurement type, because it is possible to secure a long enough length of the base line as compared with the TTL type, has an advantage that an accurate distance measurement becomes possible. The present invention relates to improvements of that type of automatic focusing apparatus which may be said by these classifications to be the active and external distance measurement type.

Next, the construction and operation of the general case of this active, external distance measurement type are described.

FIG. 1 shows a photographic lens of the so-called 4-component zoom type. In the drawing, reference numeral 1 denotes a first lens group for focus adjustment by variation of its axial position to vary the focusing (object) distance. Incidentally, as the first lens group moves to the object field, focusing can be effected down to shorter object distances. Here, letting the moved amount of the first lens group from the position at which it is sharply focused on an infinitely distant object (hereinafter referred to as "focusing movement") be denoted by X, and the focusing distance of the object by R, it is roughly safe to say that 1/R and X are in proportional relation. Therefore, from this relation, to focus on an object just in front of the lens by using the first lens group, the focusing movement has to be made extraordinarily large. Hence, it has been the common practice to limit the closest focusing distance to about 1.2 meters. In making a determination of this closest focusing distance, vignetting at the marginal zone of the image frame also is relevant. That is, the closest focusing distance is determined within the limitation that the corners of the effective image frame are not vignetted at any zooming position in the entire range of variation of the focal length.

Reference numeral 2 denotes a lens group for varying the image magnification. By varying the position of this lens group in the axial direction, the focal length is varied. Reference numeral 3 denotes a lens group for compensation. To keep constant the position of an image plane against the variation of the image magnification, this lens group cooperates with the magnification varying lens group when zooming. Reference numeral 4 denotes a diaphragm. Reference numeral 5 denotes a lens group for forming an image. Also, reference numeral 6 represents the image plane.

FIGS. 2 to 4 show the fundamental principle of a well-known one of the automatic focus adjusting methods employed in the active and external distance measurement type apparatus having the above-described 4-component type zoom lens.

In FIG. 2, a light beam for distance measurement issued from an infrared light emitting element 8 or the like is projected by a lens 9 onto an object 10 to be photographed, in this instance, a person. The projected light beam impinges on the object 10 and is irregularly reflected therefrom to a collector lens 11 which forms an image of the object on a photosensitive element 7. The image receiving surface of this element 7 is divided into two equal areas A and B, from which respective amounts of received light can be read. Now, assuming that the photographic lens is in focus, then an image of the object takes its place at the center of the entire area of the photosensitive element 7. Therefore, the outputs from the sensors A and B are almost equal to each other. In other words, as shown in FIG. 3(A), a spot of light is formed at the hatched position. If the object goes away to a position 10', the reflected light beam changes its course to a dot-and-dash line of FIG. 2, so that the light spot moves toward the area A, as shown in FIG. 3(B), where a relationship: "the output of sensor A > the output of sensor B" is established. If the object moves to a position 10'', the converse relationship: "the output of sensor B > the output of sensor A" results.

It will be understood from this principle that by bringing the first lens group 1 for focusing shown in FIG. 1 and the position of the light sensitive element 7 of FIG. 2 into dependency with each other, an automatic focusing apparatus is formed in which the in-focus state occurs just when the outputs from both sensors A and B nearly or exactly coincide with each other.

FIG. 4 shows an example of the signal processing circuit for this type of automatic focusing apparatus. In the same drawing, to the photosensitive elements 7A and 7B are connected respectively amplifier circuits 12A and 12B, high-pass filters 13A and 13B for cutting off the D.C. component, and detector circuits 14A and 14B. Further, the outputs of the detector circuits 14A and 14B are connected to integration circuits 15A and 15B respectively. The light emitting element 8 is driven by a drive circuit 22. Responsive to a control pulse signal (not shown) output from a control microcomputer 19, the drive circuit 22 activates the light emitting element 8 to produce light in pulsating form.

The pulsated reflection from the object is received by the photosensitive elements 7A and 7B. The outputs of the elements 7A and 7B are amplified to a predetermined level in passing through the amplifier circuits 12A and 12B, then deprived of their D.C. components by the high-pass filters 13A and 13B, and further go to the detector circuits 14A and 14B. The synchronously detected signals each are integrated and smoothed by the integration circuits 15A and 15B. Their sum and difference are computed by an adder 16 and a subtractor 17. These values are inputted to a comparator 18 where they are compared with respective predetermined levels. When the sum of the integrated values has reached a predetermined value $d_{A+B}$, focusing or a distance measuring operation is judged to be possible. The absolute value of the difference, too, of the integrated values is compared with the predetermined level to detect whether or not the image is in focus. When the image is out of focus, which of the near-focus and the far-focus is occurring is determined from the polarity of the difference signal. This determination result is inputted into the microcomputer 19. Depending on that result, it controls the drive circuit 20 for an electric motor 21 so that the lens is moved to the in-focus position.

Though the foregoing has shown the method of automatic focus adjustment in the active external distance measurement, other methods may be considered. For example, instead of the 2-area sensor, either a position sensor capable of detecting the absolute location of the image, or a CCD line sensor having many divided picture elements may be used to control the variation of the position of the front lens group in accordance with the result of detection of the object distance.

It is also to be noted that as the element operatively connected to the front lens group, besides the use of the photosensitive element, there are other methods of using the collection lens, or a transparent parallel flat plate arranged in the space between the collection lens and the photosensitive element.

FIG. 5 shows an operating system for the photographic lens including the above-described automatic focusing apparatus. In the figure, a tubular frame 23 containing the first lens group 1 for focusing has a geared portion 24 formed therein, and is operatively connected to the photosensitive element 7 or one of the others described above in a block 36 by means of a follower 25. A base barrel 26 carries the tubular frame 23 of the first lens group at its front end so that when the tubular frame 23 rotates about the optical axis, it is axially moved by a helicoid screw provided between it and the barrel 26. Thus, focusing is performed. A zoom ring 27 rotates in unison with a cam sleeve (not shown) fitted in the inner diameter of the barrel 26 to axially move the second lens group 2 for variation of the magnification and the third lens group 3 for compensation, while keeping predetermined relations therebetween. Thus, zooming is performed. The zoom ring 27 has a geared portion 33 formed in the outer surface thereof at the rear end. An electric motor 29 drives the diaphragm. A tube 30 holds a relay lens group 5. A zoom motor 31 rotates the zoom ring 27 through a gear 32. A focusing motor 34 rotates the tubular frame 23 of the first lens group through a gear 35. By this, the lens group for focusing moves axially. The aforesaid light emitting element 8 and the aforesaid projection lens 9 are mounted within the block 36. The aforesaid collection lens and photosensitive element are also mounted in the same block 36. A projected light ray 38 intersects with the extension of an optical axis A at a position 37.

FIG. 6 is a front view taken from the direction indicated by arrow A of FIG. 5.

FIG. 7 is a plan view showing the field of view of the photographic lens in the wide-angle end with a spot of light taking different positions for distance measurement when the object distance is 3 or 1.2 meters. FIG. 8 is similar to FIG. 7 except that the telephoto end is shown. The reason why the spot image for 3 meters lies always at the center of the area of the picture frame, (in other words, the target position does not change as the focal length varies) is that the position 37 shown in FIG. 5 is taken at 3 meters away.

Now, letting the distance between the spot images for the target position of 3 meters and the target position of 1.2 meters in the picture frame be denoted by $X_W$ in the case of FIG. 7 or by $X_T$ in the case of FIG. 8, and the focal lengths for the wide-angle end and the telephoto end by $f_W$ and $f_T$ respectively, the relationship: $X_T/X_W = f_T/f_W$ is obtained. In an object plane at the distance of 1.2 meters, therefore, the discrepancy of the target point of the projected light beam from the point in axial alignment with the photographic lens remains constant. On assumption that, as shown in FIG. 6, the separation between the optical axes of the photographic lens and the projection lens is 50 m/m and the distance to the position 37 is 3 meters (3,000 m/m), then, from $50 \times ((3,000-1,200)/3,000) = 30$, the discrepancy of the spot of light for 1.2 meters from that for 3 meters in the object plane of 1.2 meters in distance amounts to 30 m/m.

Such a phenomenon of deviating the target position from the line of sight due to the change of the object distance from the design value is called the "distance measurement parallax".

Several methods of removing such a distance measurement parallax have been proposed, one of which is exemplified in FIG. 9. The first lens group 1 in a position 44 focuses on an object 49. For this case, operative connections are made in such a way that the point of issuing light of the light emitting element 8 comes to a position 45 and the boundary between the two areas of the photosensitive element 7 to a position 48. As this condition changes by moving the object to a farther position 50, the position of the image of the spot on the photosensitive element 8 moves toward the photographic lens (upward as viewed in the figure), causing an unbalance between the outputs A and B. As a result, the near-focus state is detected and the first lens group is moved rearward to effect focusing to a farther object. At a position 43, the lens is sharply focused on the object at the farther position 50. During this time, as the focusing lens group moves from the position 44 to the position 43, the point of issuing light displaces from the position 45 to the position 46 and at the same time the light receiving boundary from the position 48 to the position 47.

The use of means for bringing both of the light projecting element and the photosensitive element simultaneously into such an operative connection with the lens group for focusing makes it possible to remove the parallax when the focusing distance is measured.

However, in the case of the apparatus shown in FIG. 9, unlike the case of the fixed passage of the projecting light beam shown in FIGS. 5 and 6, (i) the linkage mechanism becomes complicated;
(ii) the accuracy of distance measurement is lower than with the apparatus of the type having the fixed projecting light beam;
(iii) for the purpose of compensating the above-described problems, each of the parts and assembling operations must be held to an increased degree of tolerance, or the size of the apparatus must be increased, and other problems also arise.

To compensate the above-described drawbacks, a technique of making the projecting light beam coincident with the optical axis of the photographic lens by putting it in the TTL (Through-The-Lens) arrangement, too, has been proposed. But this gives rise to new problems as follows:

(i) the power to be projected into the target zone diminishes because the projecting light beam passes through lens members constituting part of the photographic lens;
(ii) for the purpose of putting the beam into the line of sight of the photographic lens, a half-reflection prism or other like expensive means becomes necessary, increasing the price; and
(iii) the use of the half-reflection prism puts an obstacle in the way of advancing the technique of minimizing the size of the lens.

Meanwhile, for photographic lenses of today, the demand of shortening the closest photographable object distance is getting stronger. And, in such a lens type as has been described above in connection with FIG. 1, mutilation of the marginal rays of light gets appreciable particularly when the angular field is wide. With this in mind, it is known to provide a structure which enables the first lens group to further move forward with the limitation of its use to, for example, the telephoto end. However, if, as such a lens is combined with the automatic focusing apparatus described above, the path of the projecting light beam is left unchanged during zooming, and the inaccuracy of distance measurement due to the parallax shown in FIG. 8 is caused to increase largely. For example, when the usable focusing range is extended to 0.6 meters at the closest distance, the target area for distance measurement in the telephoto end gets completely outside of the field of view.

As is apparent from the foregoing, in the active and external distance measurement type of automatic focusing apparatus, the model of fixing the path of the projecting light beam has been suffering from parallax. This greatly affects the accuracy and reliability of focus adjustment and, in some cases, move the target zone for distance measurement out of the field of view of the photographic lens, depending on the focal length at the telephoto end and the object distance and further degrades the spatial relationship between the optical axes of the photographic lens and the projection lens.

Also, though proposals for improving this problem have been made, several of the above-described drawbacks remain unsolved.

SUMMARY OF THE INVENTION

An object of the present invention is to provide an automatic focusing apparatus of the active and external distance measurement type which has solved the above-described problems.

According to the invention, a light beam for projection from one light emitting element is divided into a plurality of parts by a simple method as is described later in detail, giving an advantage that the probability of occurrence of a defocus due to the presence of a parallax in the distance measurement is reduced.

In a preferred embodiment of the invention, a focusing apparatus for a photographic lens comprises a light emitting element arranged outside a light beam passing through the photographic lens, a projection lens for projecting light from the light emitting element onto an object field, a collector lens arranged in spaced relation to the projection lens by a base line length, and a photosensitive element arranged behind the collection lens to receive the irregular reflection of the projected light rays from an object to be photographed, wherein the axial position of a focusing member of the photographic lens is adjusted in accordance with the output of the photosensitive element, whereby the optical path of projection of light by the light emitting element and the projection lens is divided into a plurality of optical paths by using a prism member and another prism member of the same vertex angle is arranged even in front of the photosensitive element.

DETAILED DESCRIPTION OF THE PREFERRED EMBODIMENTS

Figure 10:
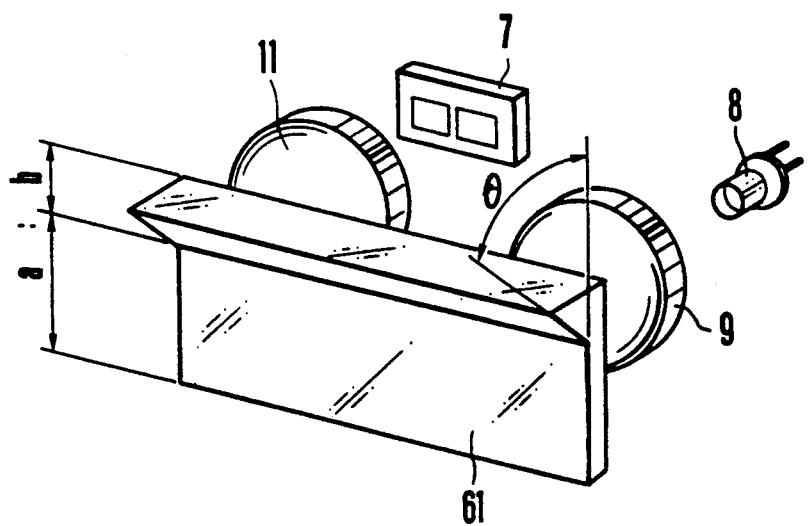
FIG. 10 is a perspective view of an embodiment of the invention.

Using FIG. 10 through FIG. 23, a first embodiment of the invention is described. In FIG. 10, an optical unit 61 is arranged so as to cover the front of the aforesaid projection and collection lenses 9 and 11 and comprises a glass block portion of plate-like shape and a prism portion through which the projected light and the arriving light can pass, thus having a beam splitting effect. Thus, the optical member is constructed from a transparent flat-plate portion and a prism portion. The light passing through the transparent flat-plate portion goes straight and light passing through the prism portion refracts. This optical unit 61 also serves the function of a so-called visible light cut filter that allows the wavelength of the near-infrared one of the light rays issued from the light emitting element 8 to pass therethrough, while cutting the light rays of the visible light region. And, the light rays from the light emitting element 8 after having passed through the projection lens 9 take such an optical path as shown in FIG. 14. FIG. 14 shows the sectional view of the light projecting system and the associated optical paths. Incidentally, the direction of the light ray to be refracted to a direction in which a photographic lens is arranged, or upward (more than the optical axis of the photographic lens) is determined by the refractive index of the prism material and the vertex angle $\theta$ of the prism portion shown in FIG. 10. Also, the ratio of the energy of the light rays to be bent by the prism portion to the energy of the light rays passing linearly through the optical unit 61, if expressed by b and a shown in FIG. 10, is determined by b:a.

Figure 1:
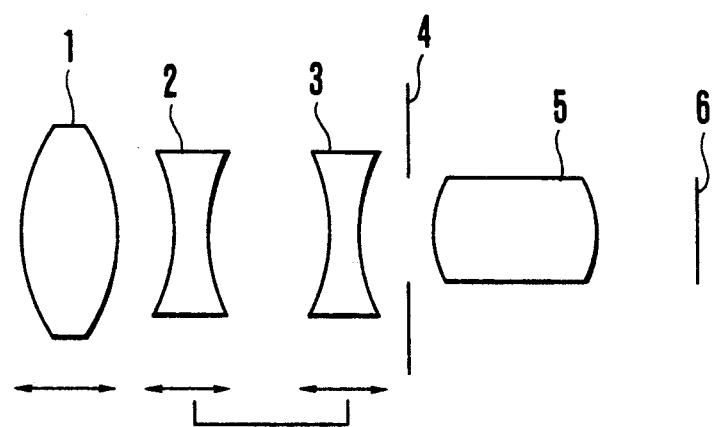
FIG. 1 is a diagram of the optical arrangement of a most popular or 4-component zoom lens.
Figure 2:
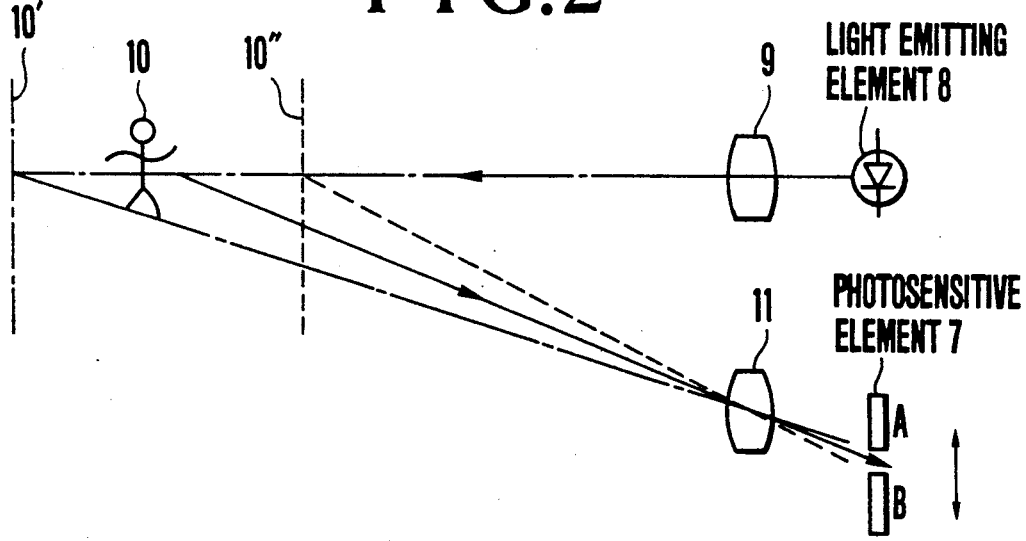
FIG. 2 is a diagram of geometry to explain the principle of the active and external distance measurement type of automatic focusing apparatus.
Figures 3A, 3B, 3C:
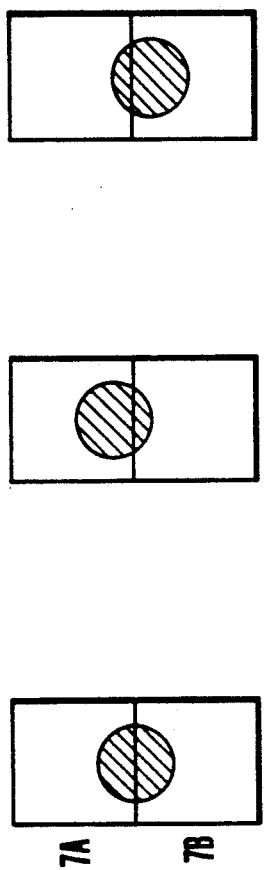
FIGS. 3(A), 3(B) and 3(C) are plan views illustrating variation of a spot light image on the light receiving surface of the photosensitive element.
Figure 4:
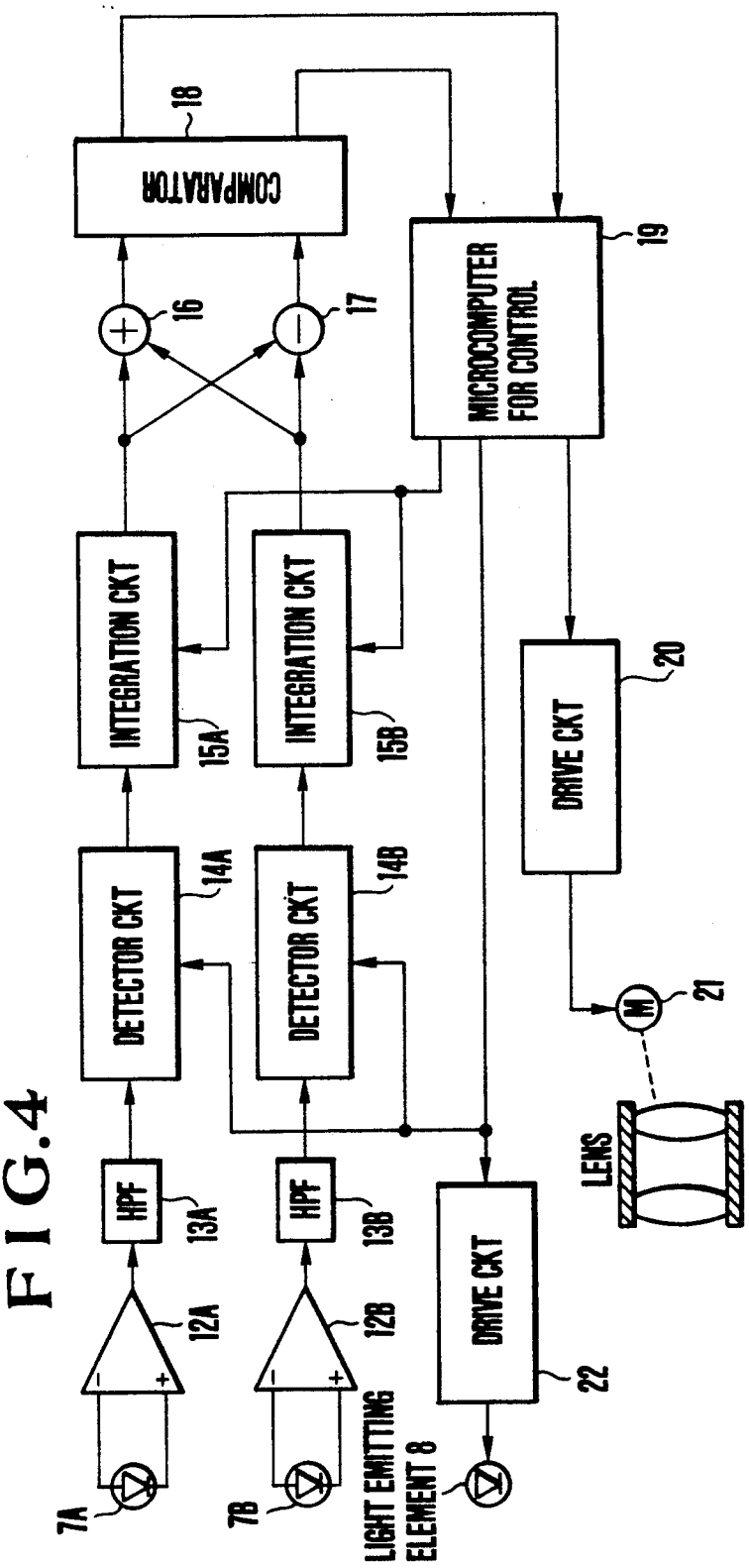
FIG. 4 is a block diagram of the circuitry of the automatic focusing apparatus.
Figure 5:
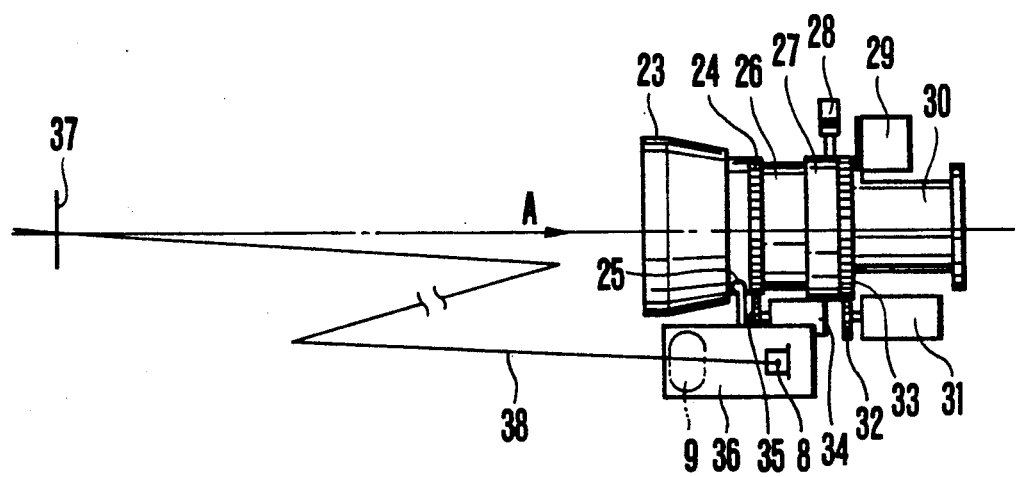
FIG. 5 is a side view of the conventional automatic focusing apparatus-equipped zoom lens.
Figure 6:
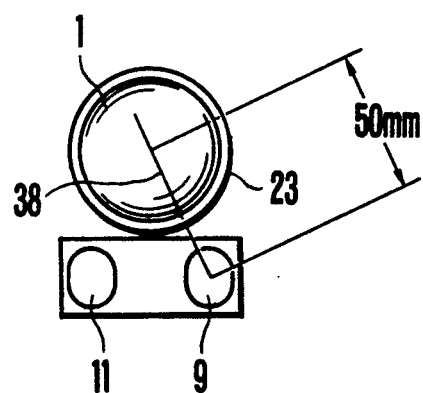
FIG. 6 is a front view of the conventional automatic focusing apparatus-equipped zoom lens.
Figure 7:
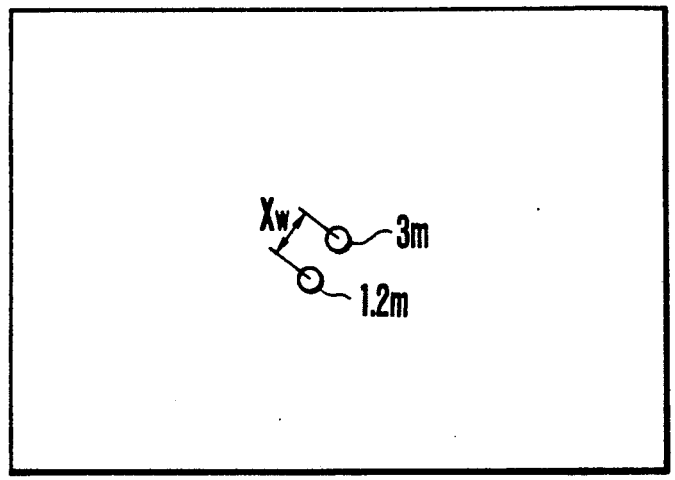
FIG. 7 is a plan view of different targets with different object distances in the conventional distance measuring device at the wide-angle end.
Figure 8:
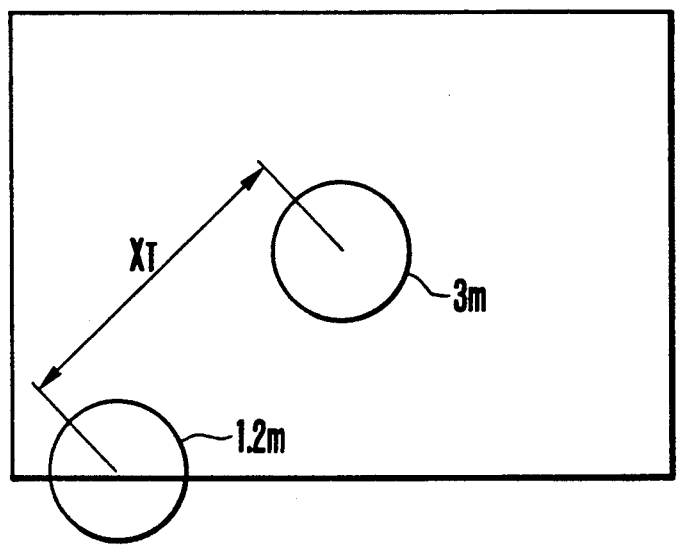
FIG. 8 is a plan view of different targets with different object distances in the conventional distance measuring device at the telephoto end.
Figure 9:
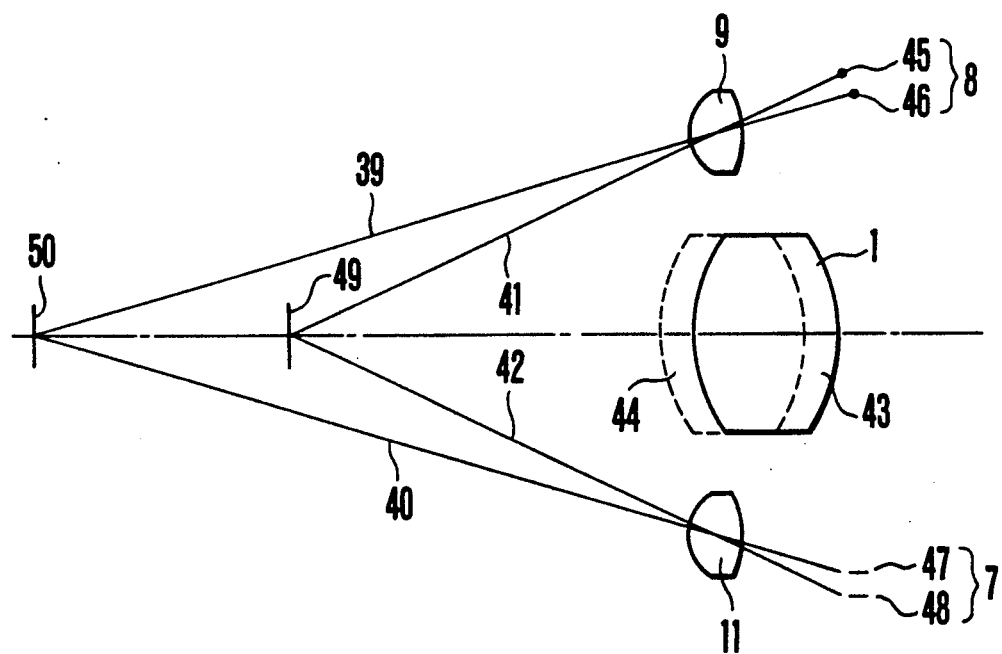
FIG. 9 is a diagram illustrating the prior known method of removing the parallax in distance measurement.
Figure 11:
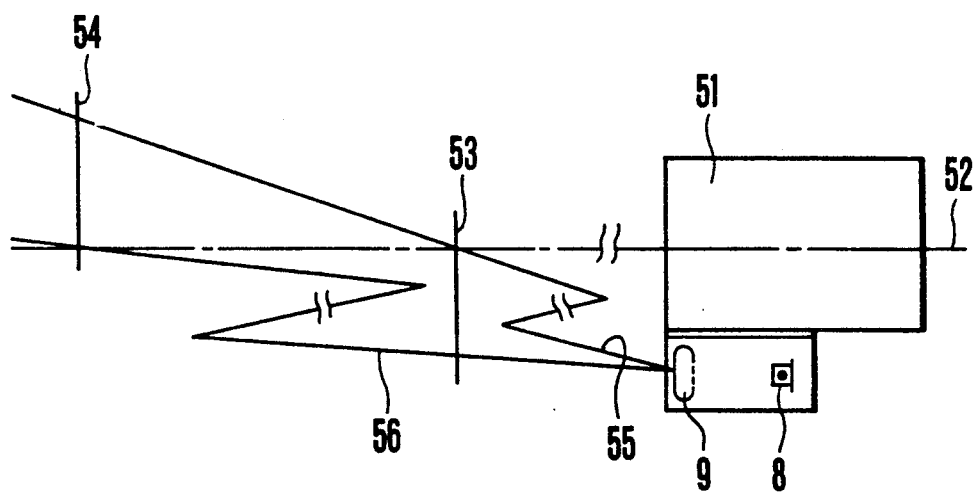
FIG. 11 is a diagram to explain the principle of the invention where a projecting light beam is divided into two parts.

Next, in FIG. 11, reference numeral 51 denotes a photographic lens. As to its details, they are the same as FIG. 5. Reference numeral 52 represents the photographic optical axis. The light rays which have passed the portion "a" of the optical unit 61 in FIG. 10 become a beam 56 shown in FIG. 11, which crosses the photographic optical axis 52 at an object distance 54. Meanwhile, the light rays which have passed the portion "b" of the optical unit 61 in FIG. 10 become a beam 55 shown in FIG. 11 which is projected to the upper side in the object distance 54. Also, for an object distance 53, when the beam has crossed the photographic optical axis 52, the beam 56 is projected to the lower side of the object.

Figure 12:
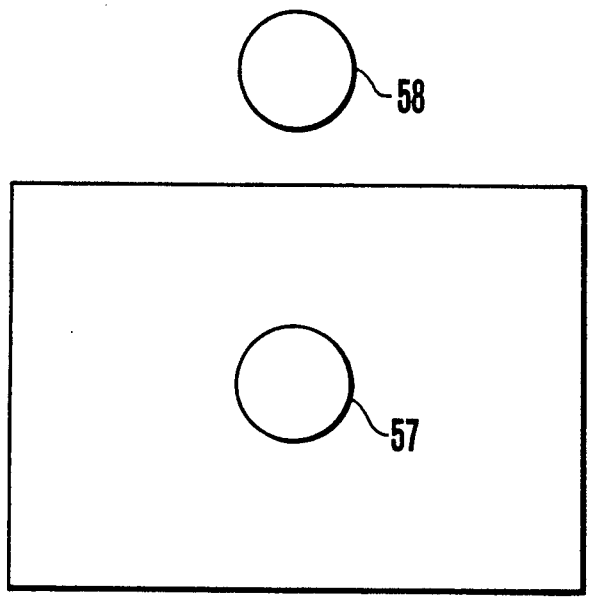
FIG. 12 is a plan view of the target zone of a distance measuring device of the invention in the telephoto end with an object at 3 meters.
Figure 13:
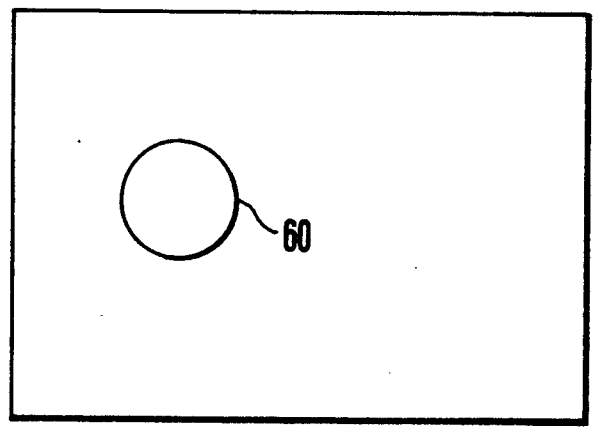
FIG. 13 is a plan view of the target zone of the distance measuring device of the invention in the telephoto end with an object at 0.6 meters.
Figure 14:
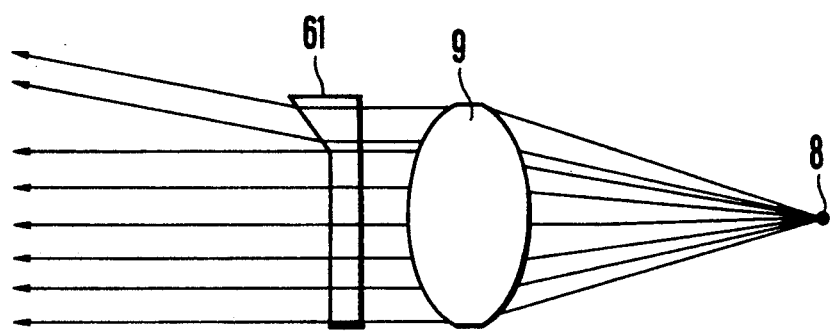
FIG. 14 is an optical section view, partly in diagram of paths of light rays, of the light projecting system of FIG. 10 which is in the first embodiment of the invention.

FIG. 12 and FIG. 13 show the projected positions of the above-described two projecting light beams on the telephoto side in the picture frame. FIG. 12 shows the position of the projected spot light image on the object at the object distance 54 shown in FIG. 11. The spot light image 57 shows the projected position of the beam 56 of FIG. 11 and reference numeral 58 represents the projected position of the beam 55. Likewise, FIG. 13 shows the position of a projected spot light image on the object at the object distance 53 shown in FIG. 11, and reference numeral 59 represents the projected position of the beam 56, and reference numeral 60 the projected position of the beam 55.

Figure 15:
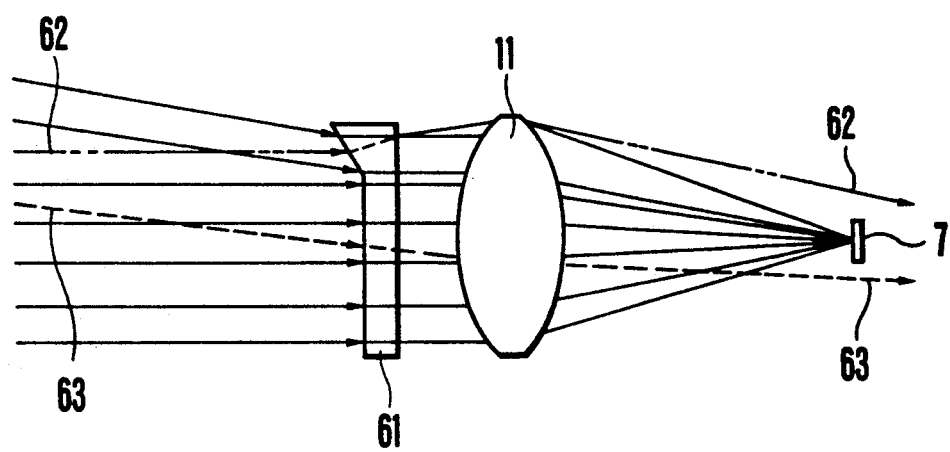
FIG. 15 is an optical section view, partly in diagram of paths of light rays, of the first specific embodiment of the light receiving system according to the invention.

These two projecting light beams return to the photosensitive element 7 through the optical paths shown in FIG. 15. That is, the projecting light beam which has passed through the portion "b" of the optical unit 61 impinges on the object, then is irregularly reflected therefrom and, when then passing through the portion "b" or the prism portion from the reverse direction, is refracted again, before it arrives at the photosensitive element 7 as shown in the figure. But, because the beam 63 which has passed through the portion "a" goes straight without being refracted, it does not return to the photosensitive element 7. Meanwhile, of the projecting light rays having passed through the portion "a" of the optical unit 61, a beam having returned past the portion "a" focuses an image on the photosensitive element 7. But, the light having passed through the prism portion is refracted by the prism effect and pursues an optical path 62 outside the photosensitive element 7, thus straying above the sensor that is the photosensitive element 7.

Figure 16:
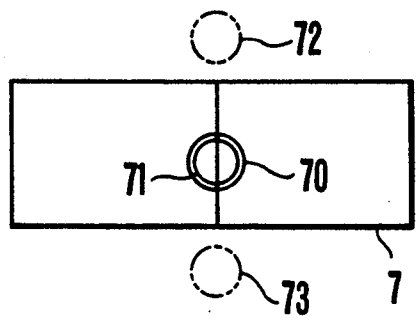
FIG. 16 is a plan view illustrating the position of an image of a spot of light on the image receiving surface of the photosensitive element.

For reference, as shown in FIG. 11, let us consider the imaging state on the photosensitive element 7 when both light beams projected by varying the direction strike the object 54 or 53 of the same distance. This is shown in FIG. 16 as viewed from the front of the photosensitive element 7. A spot light image 70 formed with the light which has been projected past the portion "a" of the optical unit 61 and is received past the same portion "a", and another spot light image 71 formed with the light which has been projected past the portion "b" and is received past the same portion "b" superimpose in the same place. Also, light rays 62 and 63 shown in FIG. 15 focus images at the positions 72 and 73 shown in FIG. 16. Therefore, though the total output obtainable from the photosensitive element 7 slightly decreases from that in the prior art, the automatic focus detecting function is as accurate as in the prior art.

Figure 17:
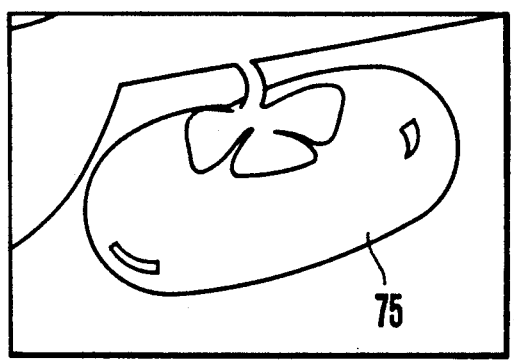
FIG. 17 is a pictorial representation of the picture frame with a distance measuring position occurring when shooting a persimmon at the closest distance in the telephoto end.
Figure 18:
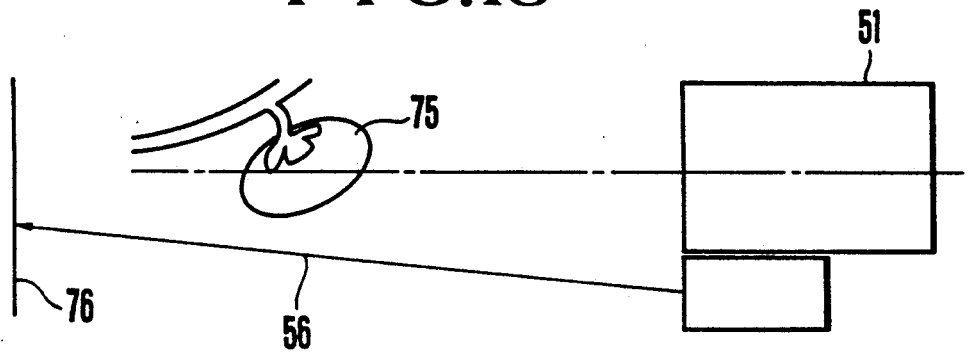
FIG. 18 is a sectional view illustrating the conventional light projecting system.

FIG. 17 shows the photographic picture of the case that a persimmon at, for example, 0.6 meters is shot at the telephoto end. In the conventional case of not dividing the light beam, the distance measuring position becomes a position 74. Suppose this position is the object plane 76 shown in FIG. 18, focusing is effected not on the persimmon but to the distance of the object plane 76. The blurring becomes largest when the object plane 76 positions itself at infinity. Because the first lens group as the focusing lens takes the equivalent focusing position to infinity, the persimmon which is to be focused on is not imaged to sharp focus at all.

Figure 19:
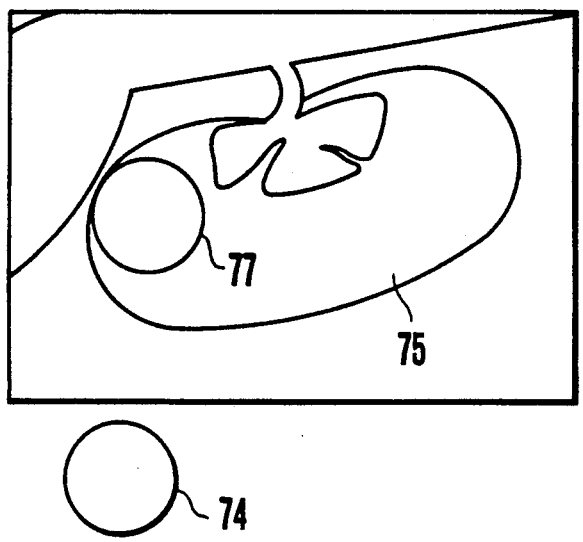
FIG. 19 is a plan view illustrating the distance measuring positions owing to the division of the light beam which is characteristic of the invention.

FIG. 19 shows the image produced by the first embodiment of the invention shown in FIG. 10. The projecting light beam which has passed through the portion "b" or prism portion of FIG. 10 is projected onto a position 77, striking the persimmon. Another position 74 corresponds to an infinitely distant object. And, in the case when the reflected light from the position 74 does not return to the photosensitive element 7 at all, the distance measurement is performed only by the reflected light from the position 77. On the photosensitive element 7, therefore, an image of the reflected light from the position 77 is formed like a spot light image 78 shown in FIG. 20(A). For this reason, while the prior art has failed to focus on the persimmon, the present embodiment enables focusing to be effected correctly.

Figure 20A:
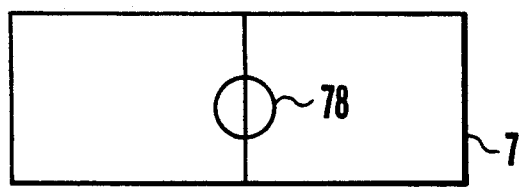
FIG. 20(A) is a plan view illustrating the imaging state on the photosensitive element in the case of the position 74 of FIG. 19 at infinity.
Figure 20B:
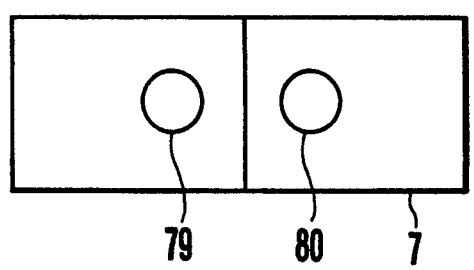
FIG. 20(B) is a plan view illustrating the imaging state on the photosensitive element in the case of the position 74 of FIG. 19 at a finite distance.
Figure 21:
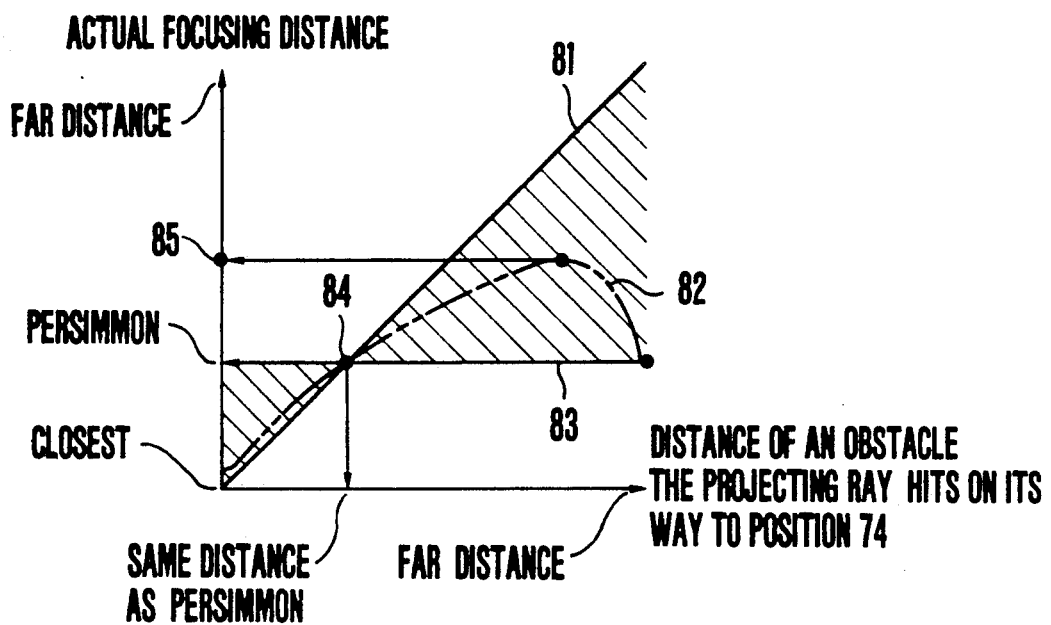
FIG. 21 is a graph to explain the advantages of the distance measuring device of the invention.

Also, if the projecting light beam directed to the position 74 of FIG. 19 has the misfortune to strike an obstacle or two, two images 79 and 80 are recognized apart as shown in FIG. 20(B) by the difference between the distance of the persimmon and the distance of the obstacle the projecting light beam strikes. For this case, what focusing distance the first lens group focuses on varies depending on the value of a:b shown in FIG. 10, the distances of the position 77 and the obstacle the projecting light beam strikes on its way to the position 74, and the reflectance of the obstacle. This will cause focusing to be effected to an intermediate distance between the persimmon's distance of 0.6 meters and the distance to the obstacle the projecting light beam strikes on its way to the position 74. Nonetheless, as compared with the possibility of causing an extreme defocus to occur as in the prior art, a far desirable focus state can result. In more detail, reference is made to FIG. 21 showing the advantage of the invention. Now, assume that the situation of an object being photographed is exactly the same as that shown in FIG. 19. And, suppose it is sure that the light beam projected to the upper position 77 reaches the object or the persimmon. Here, in FIG. 21, the abscissa corresponds to the distance of the obstacle the projecting light beam strikes on its way to the lower position 74. Also, the ordinate corresponds to the focusing distance corresponding to the position at which the first lens group of the photographic lens actually stops. Since the object to focus on is the persimmon, it is ideal that it lies on a line 83. By, the way, when there is no light beam projected to the upper position 77 as in the prior art of FIG. 17, only the light beam projected to the lower position 74 is used in measuring the distance as a matter of course. Hence, the focusing position follows a line 81.

According to the arrangement of the invention, however, what is to become the conventional line 81 can be brought nearer to the line 83 by dividing the projecting light beam into two parts. This is expressed by a dashed line curve 82 in the areas shown by hatching in FIG. 21. Here, when the focusing distance has a value shown by a point 85, the most important object, or the persimmon, is imaged with a slight blurring. Yet, compared with the result from the use of the conventional arrangement, an improved image is attained. Incidentally, for an infinitely distant object, the ideal line is approached.

Thus, the advantage of the invention is to achieve an improvement of the distance measurement error due to the parallax which becomes large at the closest object distance by dividing the projecting light beam into two parts. Meanwhile, conversely for an object at 2, or 3 meters or any of the other usual focusing distances, no deterioration of the performance is involved.

Figure 22:
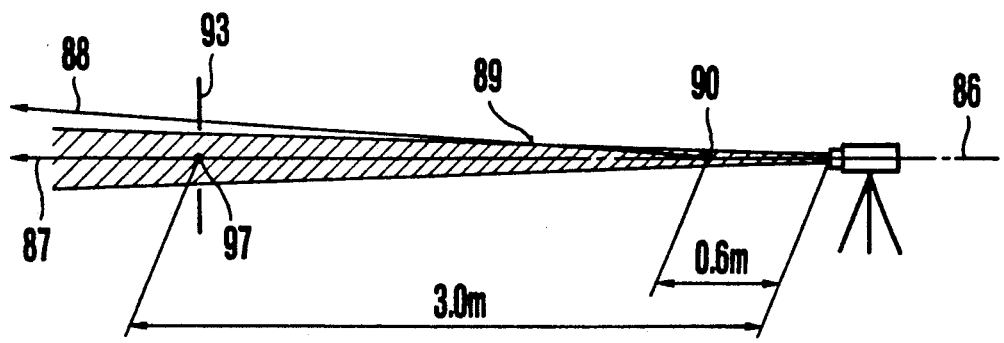
FIG. 22 and FIG. 23 illustrate a blind zone of the distance measuring device of the invention.
Figure 23:
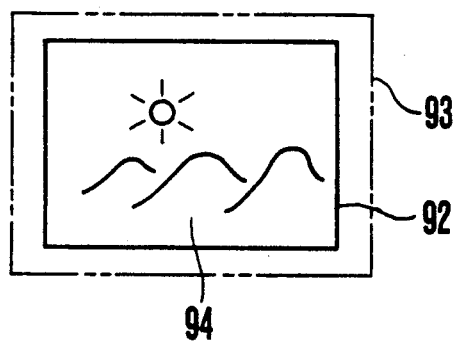

FIG. 22 is a diagram to explain actual photography with the photographic lens to which the invention is applied. An upward oriented projecting light beam 88 crosses the photographic optical axis at a point 90 of 0.6 meters away. Also, the conventional projecting light beam 87 crosses the photographic optical axis at a point 97 of 3 meters in distance. Incidentally, the area of hatching is the angular coverage of field in the telephoto end of the photographic lens. The upward oriented projecting light beam 88 gets away to above the picture frame at longer distances than the distance of the point 89.

With this, on consideration of a photographic situation where, for example, a window frame 93 lies at 3 meters and, a long way off, a landscape is seen, an electronic viewfinder presents an image 94 of the scene within a frame 92 thereof. In fact, really the window frame 93 is present outside the field of view of the finder. Setting aside how often shots are taken in such a condition, it is in such a case that of the projecting light rays, a projecting light ray 87 as usual in the prior art is projected to infinite distance. Hence, the reflected light does not return to the photosensitive element at all. Therefore, it is usual that when an output higher than a certain level is not obtained from the photosensitive element, the lens group for focusing moves to an infinite focusing position (the rearmost position). In a case where the projecting light ray 88 strikes the window frame, on the other hand, because there is no output responsive to the projecting light ray 87, the lens group for focusing moves to effect focusing to the distance of the window frame (not the object to be photographed) outside the field of view. For this reason, the image of the object or the faraway mountain is out of focus.

A method of suppressing this problem as far as possible is to limit the range of measurable distances by the ray 88 to closer distances than, for example, a point 89. For this purpose, there is need to make the power the light ray 88 has smaller than the power the light ray 87 has. Suppose the light ray 87 has so large a power $P_{87}$ that the distance of an object of 20% reflectance can be measured up to 10 meters. To this, the power $P_{88}$ of the light ray 88 may be set so that the distance of an object of 20% reflectance can be measured up to 1.0 meter. If so, then from $10 \times P_{88}/P_{87} = 1.0$, $P_{88} = 0.01 \times P_{87}$ is obtained. From this reasoning, it is understood that the power of the ray 88 may be as weak as several % of thethe power of the ray 87. By this, though differences occur depending on the reflectance of the object, there is almost no possibility of occurrence of a blurred image of the object or faraway landscape. Yet, if a power of several % is in use, for that part of the line 82 which lies between the points 84 and 85 in FIG. 21, the persimmon may be sharply focused. For the other points, however, focusing gets nearer to the line 81. So, it sometimes happens that the advantage of the invention can hardly be enjoyed. From this fact, it will become practice that an optimum power distribution on actual use has to be chosen from within a range of several % to several tens of %.

As has been described above, in the first embodiment of the invention, in the automatic focusing apparatus of the active and external distance measurement type, a visible light cut filter arranged in front of the projection and collection lenses is made to form a wedge shape, by which the optical path is divided into two parts, wherein one of these optical paths is arranged to cross the photographic optical axis at such an object distance as is common in the prior art, say, 2 or 3 meters, while the other optical path is arranged to cross the photographic optical axis at the closest end of the range of object distances, for example, 0.6 meters. Further, if desired, an additional arrangement is employed that, compared with the power passing through the optical path equivalent to that in the prior art, the other power is made weak (several % to several tens of %). The use of these features enables the realization of an automatic focusing apparatus which has greatly decreased the blurring due to the parallax dependent error of distance measurement at the closest object distance, and has prevented the performance from deteriorating at the other object distances.

Figure 24:
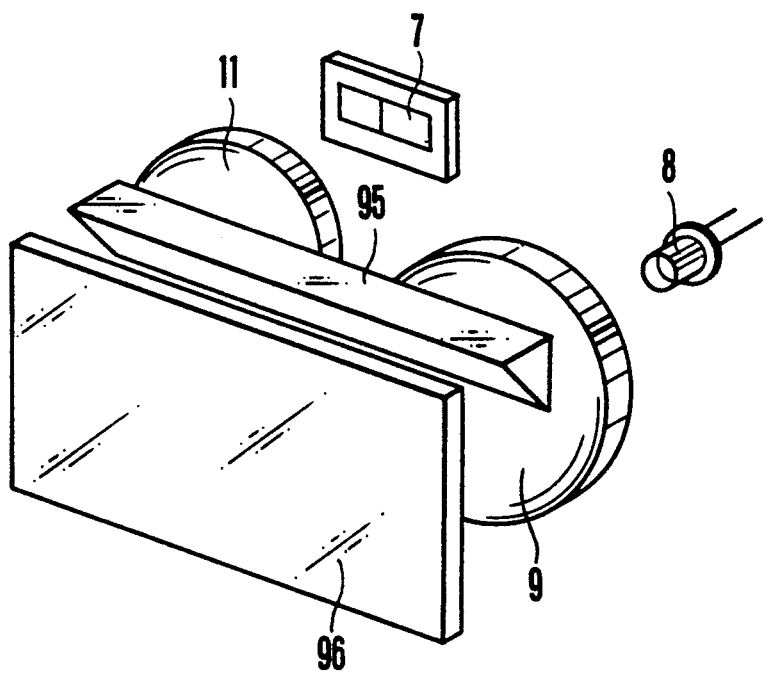
FIG. 24 is a perspective view of a second embodiment of the invention.

FIG. 24 shows a second embodiment of the invention. In the first embodiment, the prism for splitting the optical path is made up in a unified form with the visible light cut filter. In some cases, the visible cut filter becomes an outer extending part. In this connection, it is also possible that the portion shown by the angle θ in FIG. 10 is not suited to extend outward. On consideration of this point, in ex the second embodiment, the part for splitting the optical path is provided in separate form.

In FIG. 24, reference numeral 96 denotes the visible light cut filter, and reference numeral 95 denotes the optical path splitter or prism part.

Figure 25:
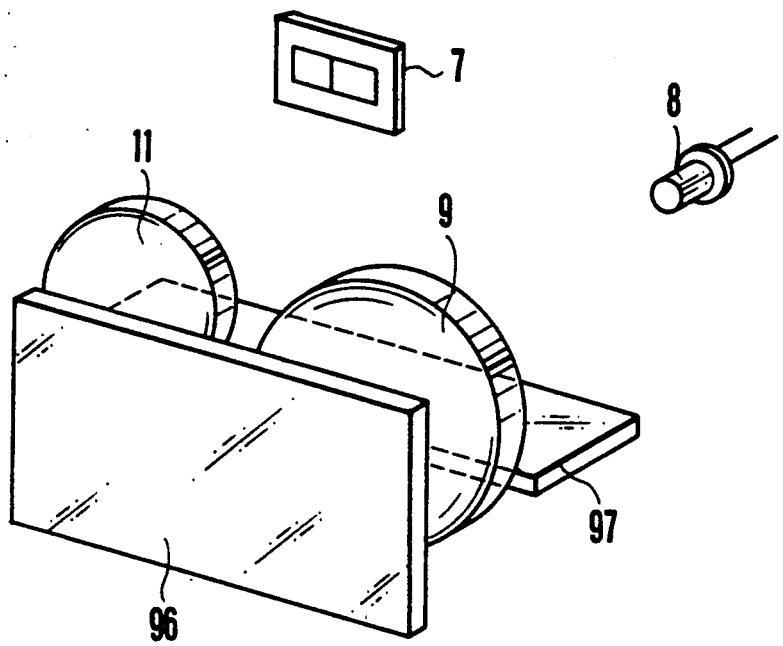
FIG. 25 is a perspective view of a third embodiment of the invention.
Figure 26:
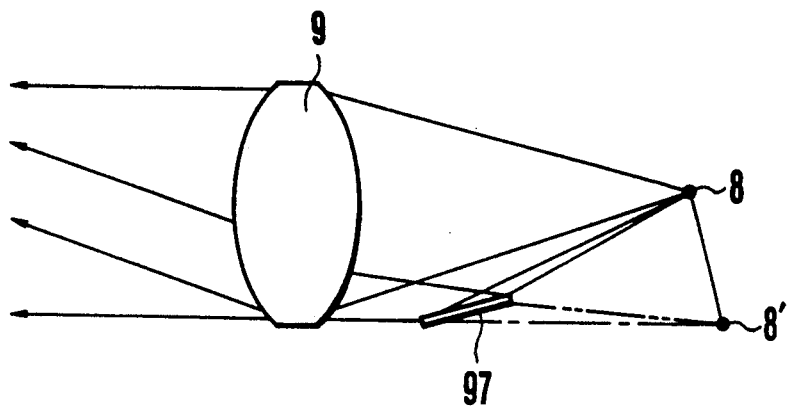
FIG. 26 is a sectional view, partly in diagram of paths of light rays, of the light projecting system shown in FIG. 25.

In FIG. 25 and FIG. 26, there is shown a third embodiment of the invention. The third embodiment does not alter the power of the light emitting element which is effectively projected to the object field. As new light rays which are oriented upward, use is made of that fraction of the light which is not picked up by the projection lens 9. In these figures, a visible light cut filter 96, a projection lens 9, a collector lens 11, a photosensitive element 7 and a light emitting element 8 each are constructed and arranged in similar ways to those described before. Yet, a mirror 97 is arranged beneath the effective light beam of the projection lens 9. By this mirror, the light rays which have not been used in the prior art are directed to the effective edge portion of the projection lens 9 and projected therefrom upward. In FIG. 26, there is shown the sectional view. The light originating point 8, if viewed from the object field, is equivalent to there being another light originating point at a position 8'. The light rays from the position 8' are projected upward.

By the way, the length of the image receiving surface of the photosensitive element 7 in the longitudinal direction must be long enough to cover the range of movement of an image of a spot of the received light as it moves with variation of the object distance. For a wider range of object distances from infinity to the closest distance, if the range of movement of the received spot light image is made to cover it, a necessity arises that the longitudinal length of the surface of the photosensitive element 7 be made longer.

In turn, the increase of the length, or the sensor area, of the photosensitive element 7 makes it impossible to ignore the influence of other light than the necessary or infrared light. And, the S/N ratio of the output representing the received light amount is lowered. This leads to a difficulty of maintaining the accuracy of distance measurement.

Next, while considering this problem, another embodiment will be described where, despite the use of the photosensitive element of a length on the same order as in the prior art, that is, without lowering S/N ratio, the distance can be measured.

Figure 27:
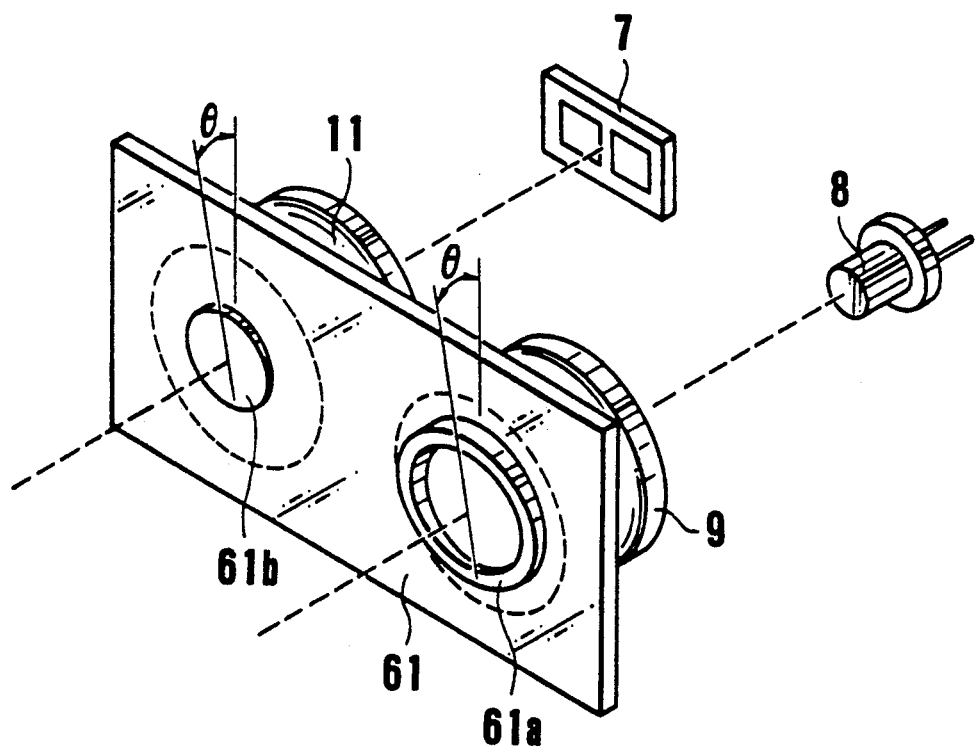
FIG. 27 is a perspective view of a fourth embodiment of the invention.
Figure 28A:
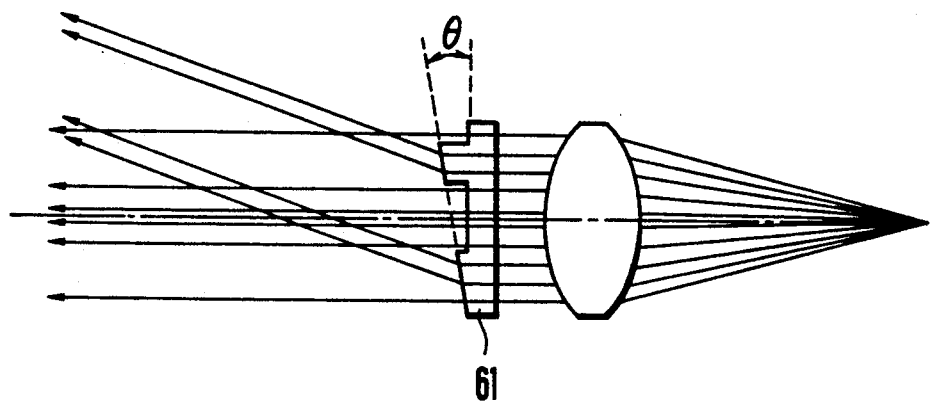
FIGS. 28(A) and 28(B) are side sectional views of another light projecting and receiving system of the invention, respectively.
Figure 28B:
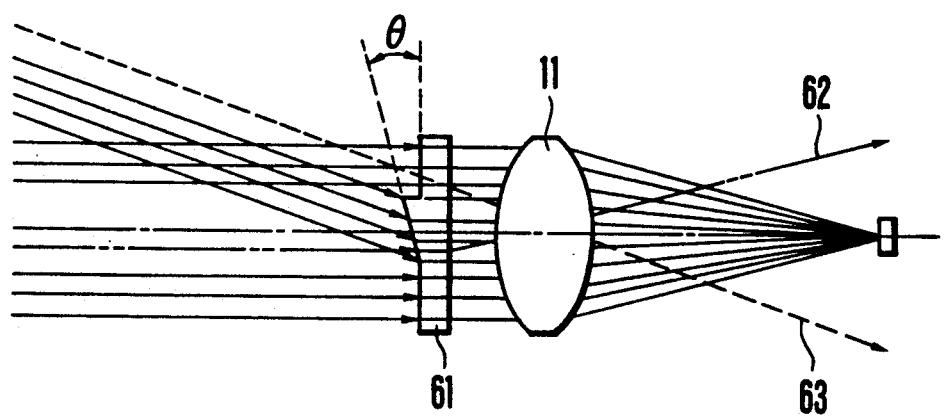

FIG. 27 is a perspective view of a distance measuring optical system according to the invention. FIG. 28(A) and FIG. 28(B) show respectively the side sectional views of the light projecting optical system and the light receiving optical system, and diagrams of their optical paths.

An optical unit 61 of the light projection side is constructed in such a way that instead of the before-described triangular prism, as the portion for projecting a light beam to the closest object, use is made of an annular or ring area portion 61a which has a predetermined vertex angle θ, while, with an optical axis of the projecting light beam as the center, a portion in the neighborhood of this optical axis is removed. Meanwhile, an optical system of the light receiving side has an equal vertex angle θ, and has an area 61b of a disc shape on a light receiving optical axis, which fulfills the prism function.

Now, the projecting light rays, on consideration of the accuracy of distance measurement of the active type, is projected and adjusted so as to focus a spot light image usually at 3 meters or thereabout. But, when the closest object distance becomes 0.6 meters, the spot light image is defocused to some extent. Therefore, a somewhat widened spot light image is cast. Since this widening is nearly proportional to the diameter of the projection lens, the diameter of the annular prism portion is made as large as possible, in other words, a farther area portion away from the optical axis of the projecting light beam is used, so that the image of the projected light spot on the light receiving surface of the photosensitive element gets larger. Therefore, even if the spot falls outside the photosensitive element, the edge of the blurred image of the received spot can override the sensor area with an advantage that an actuation for distance measurement becomes easy to start.

By the way, the most preferable thing is to make the outer diameter of the ring shape to be an annular area having an equal outer periphery to the maximum effective diameter of the projection lens. In a case where the diameter of the projection lens is not round in the strict sense, however, it is necessary to alter it to the effective minimum diameter. Also, because the optical unit 61 is a separate member from the projection lens, on consideration of the error in the alignment of the optical axes, it is desired that the outer diameter of the prism portion is made slightly smaller.

Meanwhile, the prism portion to be provided in the collector lens portion is preferably provided in the neighborhood of the optical axis center of the collector lens, because the better the imaging performance, the higher the accuracy of distance measurement. Incidentally, the form is not limited to the round shape. It may also be constructed in rectangular or polygonal form. Also, it may be an annular shape having discontinuous prism areas.

Also, the prism portion may be arranged on either of the object side and the projection and collector lens side of the optical unit. But, there is a case where the optical unit 61 serves as the visible light cut filter. In this case, it is desired, to put it on the lens side, because, on the outside surface, no protrusion is formed. At this time, it becomes reasonable that the angle that corresponds to the view angle of the projecting and receiving light elements is made to be the draft at the time of plastic mold formation. Thus, the prism portion in the projected light is formed in a ring shape with its center at an optical axis of the projection lens. The prism portion in the incident light is formed in a disc shape with its center at an optical axis of the collection lens.

As has been described above, in this embodiment of the invention, in the automatic focusing apparatus of the active and external distance measurement type, by making a portion of the visible light cut filter arranged in front of the projection and collector lenses a wedge shape, the optical path is divided into two parts and one of the optical paths is arranged to cross the photographic optical axis likewise as in the prior art at such an object distance as 2 or 3 meters, while the other optical path is arranged to cross the photographic optical axis at or near the closest distance of the range of object distances, say, for example, 0.6 meters. Further, it is desirable that compared with the power passing through the optical path like the prior art, the other power is made weak (several % to several tens of %). The use of these features enables the realization of an automatic focusing apparatus which has greatly decreased the blurring due to the parallax dependant error of the distance measurement at the closest object distance, while preventing the performance from deteriorating at the other object distances.

By the way, the use of the upward oriented light beam for close objects, which is characteristic of the invention, has made it possible to lessen the blurred scene due to the parallax dependent error of the distance measurement. Meanwhile, in the prior art, the spot light image projected on the object is sharp when the object distance is the most common, say 2 meters or 3 meters. Therefore, the projected light spot image with the light rays for a close object is projected to the object at the closest distance in the condition that the image sharpness is reduced to some degree. Therefore, an arrangement may be considered that the prism portion for dividing the optical path into two parts shown in FIG. 24 or FIG. 10 is given a predetermined optical power (made a lens), so that the upward oriented projecting spot light image is in sharp focus at, for example, 0.6 meters.

The use of such an arrangement makes it possible to achieve an improvement of the accuracy of distance measurement by the upward oriented projecting spot light image.

Also, though the embodiments have been described in connection with the example of dividing the optical path into two parts, it is possible to increase the number of these parts to three or more.

As has been described above, in the automatic focusing apparatus of the active and external distance measurement type, by dividing the light projecting and light receiving optical paths into plural numbers of parts with different optical axes, it becomes possible to decrease the blurring of the image due to the parallax dependent error of the distance measurement which has been produced for an object, particularly at the closest distance.

We claim:

1. An external distance measurement type focusing apparatus for a photographic lens, comprising:
light projecting means for projecting light onto an object field;
light receiving means for receiving light reflected from the object field, the reflected light having bypassed the photographic lens;
an optical member arranged in the light projected by said light projecting means and in the light incident on said light receiving means to refract a portion of each of the projected and the reflected light, for reducing distance measurement parallax; and
detecting means for detecting a focusing state of said photographic lens on the basis of the reflected light reaching said light receiving means.

2. An apparatus according to claim 1, wherein said optical member comprises a prism.

3. An apparatus according to claim 2, wherein said light projecting means includes a light source and a projection lens for projecting light of said light source as a beam, and wherein said light receiving means includes a collection lens and a sensor having at least two light receiving areas, said prism being arranged on the object field side of said projection lens and said collection lens.

4. An apparatus according to claim 3, wherein said optical member comprises a transparent flat plate portion and a prism portion, and wherein light passing through said transparent flat plate portion goes straight and light passing through said prism portion refracts.

5. An apparatus according to claim 4, wherein said prism portion in the projected light is formed in a ring shape with its center at an optical axis of said projection lens, and wherein said prism portion in the incident light is formed in a disc shape with its center at an optical axis of said collection lens.

6. An external distance measuring device for an objective lens, comprising:
light projecting means for projecting light onto an object to be photographed;
light receiving means for receiving light reflected from the object, which light has bypassed the objective lens;
an optical member arranged in a portion of each path of the light projected by said light projecting means and the light incident on said light receiving means to refract each of the projected and the reflected light, for reducing distance measurement parallax; and
a discriminating circuit for determining a distance to the object on the basis of the reflected light received by said light receiving means.

7. A device according to claim 6, wherein said optical member comprises a prism.

8. A device according to claim 7, wherein said light projecting means includes a light source and a projection lens for projecting light of said light source as a beam, and wherein said light receiving means includes a collection lens and a sensor having at least two light receiving areas, said prism being arranged on the object field side of said projection lens and said collection lens.

9. A device according to claim 8, wherein said optical member comprises a transparent flat plate portion and a prism portion, and wherein light passing through said transparent flat plate portion goes straight and light passing through said prism portion refracts.

10. A device according to claim 9, wherein said prism portion in the projected light is formed in a ring shape with its center at an optical axis of said projection lens, and wherein said prism portion in the incident light is formed in a disc shape with its center at an optical axis of said collection lens.

* * * * *

UNITED STATES PATENT AND TRADEMARK OFFICE
CERTIFICATE OF CORRECTION

PATENT NO. : 5,087,935                Page 1 of 2

DATED      : February 11, 1992

INVENTOR(S) : Naoya KANEDA, et al.

It is certified that error appears in the above-identified patent and that said Letters Patent is hereby corrected as shown below:

On the Title page, item

[75] Inventors
    "Kanagawa," should read --Yokahama,--.
Title page,
[57] ABSTRACT, col. 2, line 10,
    "phtotgraphed" should read --photographed--.

COLUMN 1:
    Line 39, "called" should read --is called--; and
    Line 66, "by" should read --be--.

COLUMN 4:
    Line 13, "frame," should read --frame--; and
    Line 49, "element 8" should read --element 7--.

COLUMN 5:
    Line 37, "if, as" should read --if--;
    Line 43, "meters" should read --meter--;
    Line 49, "been suffering" should read --suffered--;
    Line 51, "move" should read --moves--; and
    Line 54, "distance" should read --distance,--.

COLUMN 6:
    Line 20, "even" should be deleted;
    Line 31, "variation" should read --variations--; and
    Line 58, "meters." should read --meter.--.

COLUMN 8:
    Line 63, "meters" should read --meter--.

COLUMN 9:
    Line 33, "meters" should read --meter--.

UNITED STATES PATENT AND TRADEMARK OFFICE
CERTIFICATE OF CORRECTION

PATENT NO. : 5,087,935

DATED : February 11, 1992

INVENTOR(S) : Naoya KANEDA, et al.

It is certified that error appears in the above-identified patent and that said Letters Patent is hereby corrected as shown below:

COLUMN 10:
    Line 10, "meters" should read --meter--;
    Line 50, "$10 \times P_{88}/P_{87} = 1.0$," should read --$10 \times \sqrt{P_{88}/P_{87}} = 1.0$,--; and
    Line 53, "thethe" should read --the--.

COLUMN 11:
    Line 9, "meters." should read --meter.--;
    Line 23, "visible" should read --visible light--; and
    Line 27, "ex" should be deleted.

COLUMN 12:
    Line 26, "rays," should read --ray,--;

COLUMN 13:
    Line 21, "meters." should read --meter.--;
    Line 27, "dependant" should read --dependent--; and
    Line 47, "meters." should read --meter.--.

Signed and Sealed this

Sixth Day of July, 1993

Attest:

MICHAEL K. KIRK

*Attesting Officer*     Acting Commissioner of Patents and Trademarks